R. R. DAMOUDE.
WEED DIGGER.
APPLICATION FILED JUNE 29, 1908.
943,817.
Patented Dec. 21, 1909.
3 SHEETS—SHEET 1.
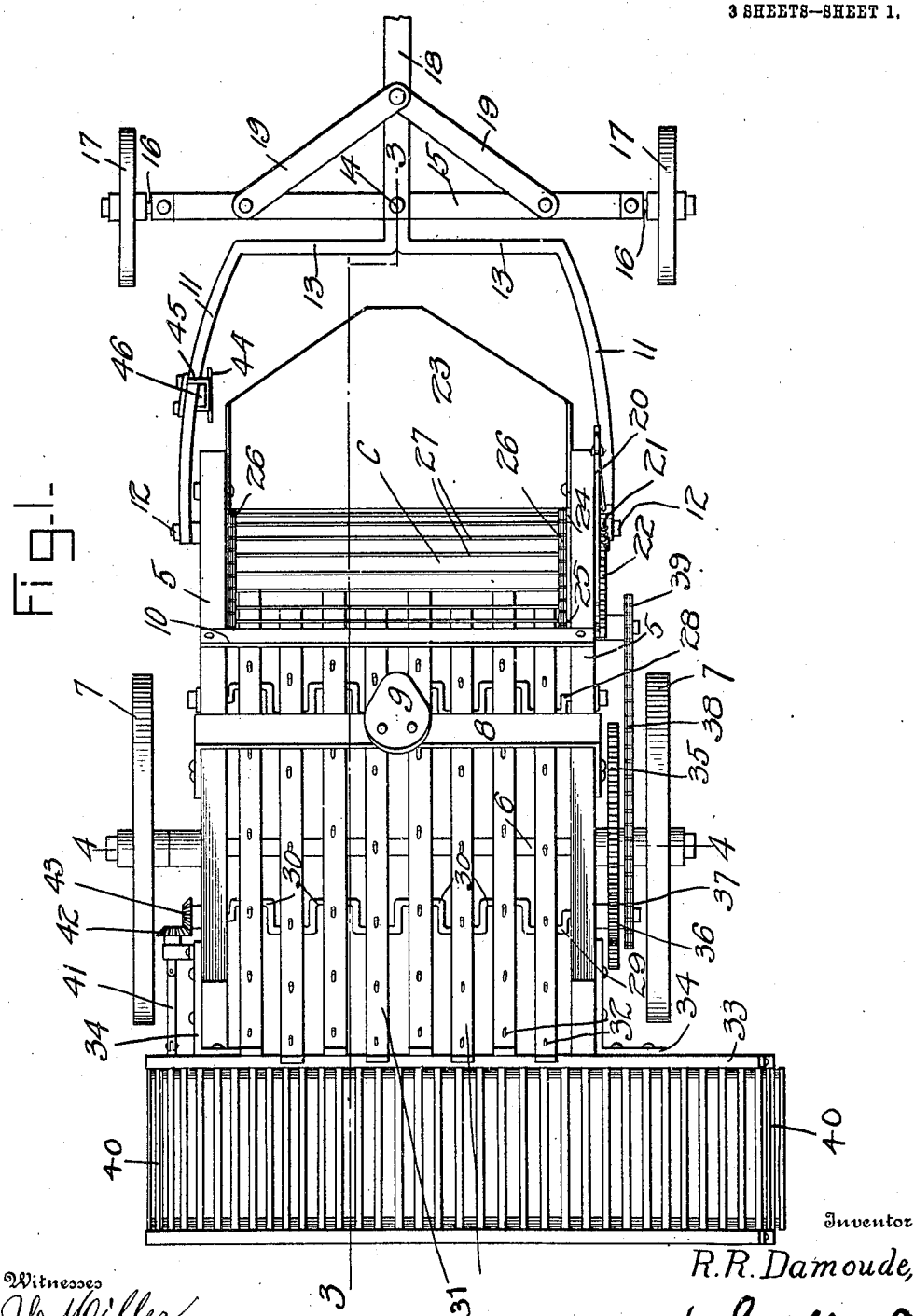

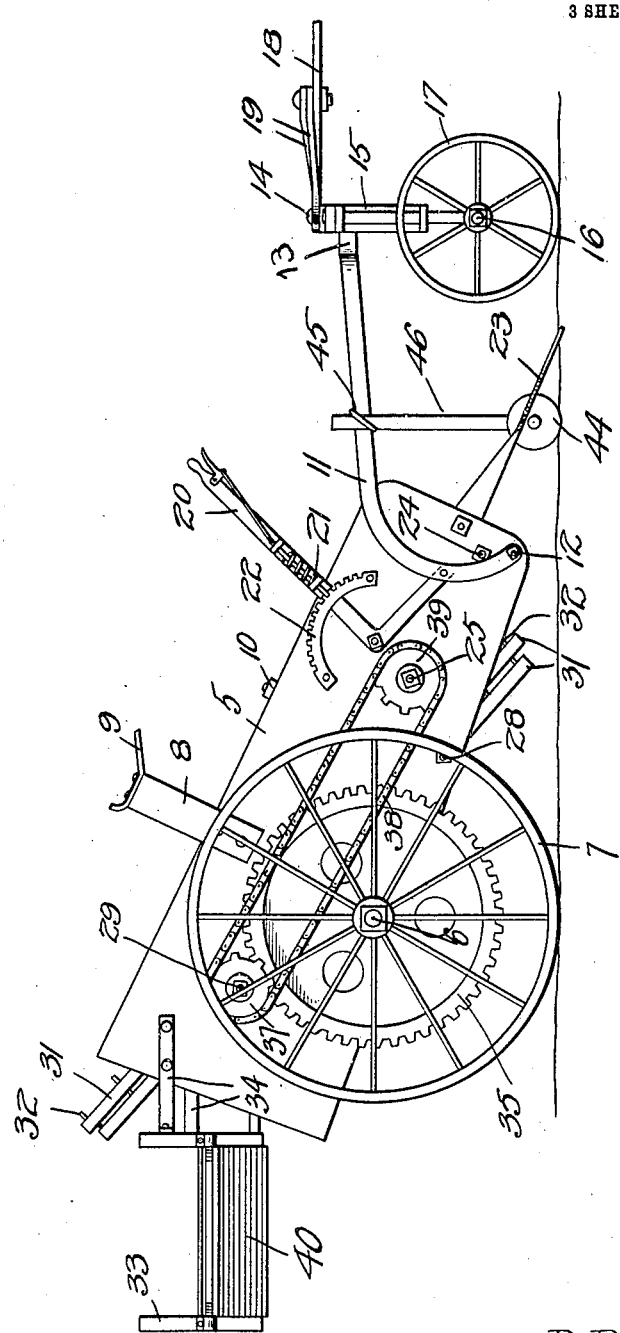

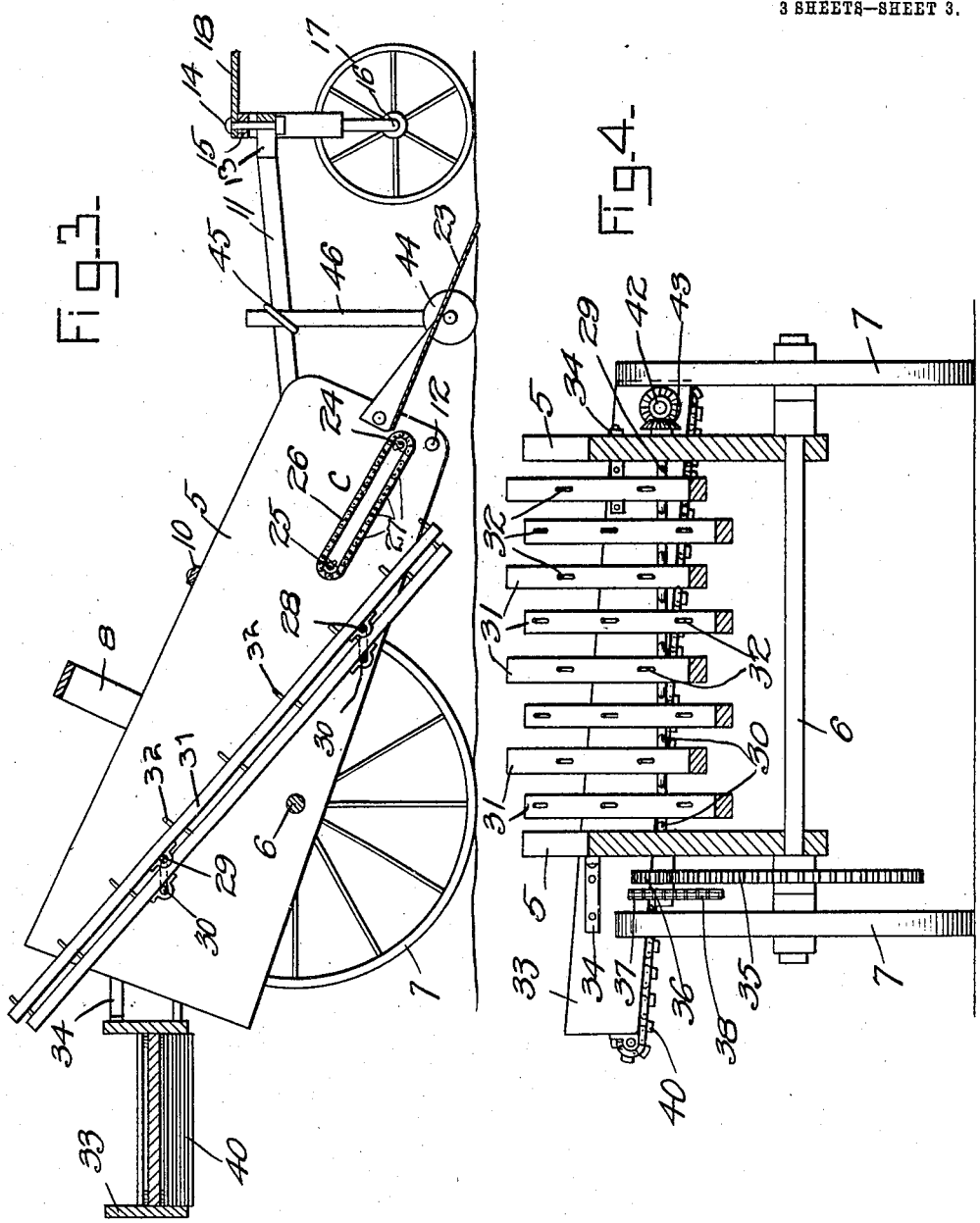

UNITED STATES PATENT OFFICE.

RICHARD R. DAMOUDE, OF PLAINVIEW, MINNESOTA.

WEED-DIGGER.

943,817.　　　　Specification of Letters Patent.　　Patented Dec. 21, 1909.

Application filed June 29, 1908. Serial No. 440,919.

*To all whom it may concern:*

Be it known that I, RICHARD R. DAMOUDE, a citizen of the United States, residing at Plainview, in the county of Wabasha and State of Minnesota, have invented a new and useful Weed-Digger; and I do hereby declare the following to be a full, clear, and exact description of the invention, such as will enable others skilled in the art to which it appertains to make and use the same.

This invention relates to machines for digging and separating weeds, grass, roots and the like from the soil; and it has for its objects to provide a machine of this character which at one operation will dig the roots from the soil, separate them from the adhering dirt, and deliver them into a receptacle such as the box of an ordinary wagon which may be driven alongside, or with which the improved machine may be connected in any convenient manner.

Further objects of the invention are to simplify and improve the construction and operation of this class of machines.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention; it being however understood that no limitation is necessarily made to the precise structural details therein exhibited, but that changes, alterations and modifications within the scope of the invention may be resorted to when desired.

In the drawing; Figure 1 is a top plan view of a machine constructed in accordance with the invention. Fig. 2 is a side elevation. Fig. 3 is a longitudinal sectional view taken on the plane indicated by the line 3—3, in Fig. 1. Fig. 4 is a vertical transverse sectional view taken on the plane indicated by the line 4—4 in Fig. 1.

Corresponding parts in the several figures are denoted by like characters of reference.

The improved machine comprises a box or frame including side pieces 5, 5, which are provided with bearings for the shaft or main axle 6, having the transporting wheels 7. The side pieces 5 support an arched cross-bar 8 carrying a seat 9 for the driver; a foot-rest 10 is supported upon the side pieces in front of the seat supporting bar.

Pivotally connected with the side pieces 5, 5, near their front ends are draw-bars 11, which are preferably formed with downturned rear ends for the passage of the pivotal connecting bolts 12 which are located near the lower front corners of the side pieces 5; the draw-bars 11 are provided at their front ends with laterally projecting inward extending arms or brackets 13, that are suitably connected to each other to afford a bearing for a vertical pin or king-bolt 14 supporting the front truck which includes an arch 15 having stub axles 16 upon which the wheels 17 are mounted for rotation. The tongue 18 is connected with the truck-frame 15 by means including the braces 19.

Pivotally supported upon one of the side pieces 5 is a bell-crank lever 20, one arm of which is pivotally connected with one of the draw bars 11; the other, longer arm of the bell-crank is equipped with a suitable stop-member 21, engaging a segment rack 22, whereby the bell-crank and related parts may be securely retained at various adjustments. It will be readily seen that by manipulating the bell-crank lever 20 the main frame of the machine may be tilted upon its axle, thus enabling the forward end of the machine to be adjusted vertically; such adjustment being highly important for reasons which will be presently made apparent.

Suitably mounted and secured between the forward ends of the side-pieces 5 is a digger 23, which has been illustrated as consisting of a suitably constructed blade or shovel disposed on an inclined plane, and having an approximately V-shaped cutting edge adapted to penetrate into the soil to a depth which may be regulated by properly adjusting the forward end of the machine by means of the adjusting lever 20, as previously described; said blade or shovel projecting a suitable distance in advance of the main frame of the machine in the direction of the front carrying truck. Shafts 24, 25 which are supported for rotation in the side pieces 5, 5, support an endless carrier C, comprising a pair of endless elements such as chains 26, connected at suitable intervals by flights or cross-bars 27; said carrier being extended forwardly beneath the digger 23 so that the material excavated by the latter will be deposited upon said endless carrier and be conveyed by the latter in an upward and rearward direction.

The side pieces 5, 5, are provided with bearings or transverse shafts 28 and 29, the former of which is located adjacent to the shaft 25 that supports the rear end of the endless carrier C, while the shaft 29 is located relatively near the rear end of the main frame of the machine. The shafts 28 and 29 are each formed with a plurality of cranks 30 intermediate the sides of the frame, said cranks serving to support a plurality of vibratory arms, bars or slats 31 which coöperate to form a combined screen and carrier; said bars being provided with upward extending teeth or prongs 32. The lower, front ends of the bars 31 are extended beneath the endless carrier C, and the upper, rear ends of said bars are extended rearwardly of the side pieces 5 and above a trough or chute 33, which is supported in rear of the main frame, and transversely of the latter, by means of brackets 34 connected with the side pieces 5.

Suitably connected with the axle 6, or with one of the transporting beams upon said axle is a spur wheel 35, meshing with a pinion 36 upon the shaft 29 to which rotary motion will thus be imparted when the machine is in operation. The shaft 29, also carries a sprocket wheel 37, which is connected by a chain 38 with a sprocket wheel 39, upon the shaft 25 supporting the rear end of the carrier C, which thus receives motion. The shaft 28 supporting the lower front ends of the bars 31 is not rotated, but is simply rocked or oscillated, when the machine is in operation, by the action of the vibratory bars connected with the cranks upon said shaft.

The trough or chute 33 is preferably equipped with a suitably constructed endless carrier 40, which may be conveniently driven by means of a tumbling rod 41 and bevel gears 42 from a bevel gear 43 upon the crank-shaft 29.

A disk cutter or rolling colter 44 of ordinary well known construction has been shown connected adjustably with one of the draw-bars 11 by means of a clip 45 engaging the said draw-bar and the colter-carrying arm 46; said colter is preferably supported adjacent to one side edge of the digger 23 for the purpose of cutting the roots of grass and weeds, thus greatly improving and facilitating the operation of the machine.

From the foregoing description taken in connection with the drawings hereto annexed, the operation and advantages of this invention will be readily understood. To prepare the soil for planting it is extremely desirable to eliminate the roots of so-called witch grass, as well as weeds of every description, and to separate the same from the adhering soil. By manipulating the adjusting lever 20 the machine may be set or adjusted in such a manner as to cause the digger to penetrate into the soil to any desired depth thus detaching the sod which will be guided over the inclined plane of the digger or shovel and onto the carrier C, from which it is delivered to the carrier composed of the vibratory bars 31. In its passage over the carriers the sod will be torn, disintegrated and subjected to a thorough shaking and screening action whereby the dirt adhering to the roots will be separated and permitted to drop upon the surface of the ground, while the weeds and roots are discharged over the rear ends of the bars 31, into the chute 33 from which the said weeds and roots may be delivered into a suitable receptacle such as the box of a wagon driven alongside the machine. It is obvious that, within the scope of the invention, the improved machine may be connected with a wagon in such a manner that the weeds and roots will be delivered directly into the wagon-box over the rear ends of the vibratory carrier bars 31. It is also very obvious that means, such as clutch mechanism of well-known construction may be employed, if desired, for the purpose of throwing the various parts of the machine into and out of operation, as may be thought desirable.

Having thus described the invention, what I claim is:

1. In a machine of the character described, a tiltingly supported box frame, a digger at the forward end of said frame, means for supporting and effecting vertical adjustment at the forward end of the frame, an endless carrier supported between the sides of the box frame and extended forwardly beneath the digger, a carrier comprising crank shafts supported in the sides of the frame and vibratory bars supported upon the cranks of the shafts the forward ends of said bars being extended beneath the rear end of the endless carrier, and means for imparting rotary motion to one of the crank shafts and to the endless carrier.

2. In a machine of the character described, a tiltingly supported box frame, a digger at the forward end of said frame, an endless carrier supported in rear of and extended beneath the digger, crank shafts supported in the sides of the box-frame, vibratory carrier bars supported upon the cranks of the shafts and extended downwardly and forwardly beneath the rear portion of the endless carrier, means for actuating the latter and one of the crank shafts, a chute supported transversely below the discharge ends of the carrier bars, a driven endless carrier in said chute, and means for supporting and effecting vertical adjustment of the forward end of the box-frame.

3. In a machine as set forth, a tiltingly supported box frame, a digger at the forward end of said frame, an endless carrier supported in rear of and extended beneath the digger, crank-shafts supported in the sides of the box-frame, vibratory carrier bars supported upon the cranks of the shaft and extended downwardly and forwardly beneath the rear portion of the endless carrier, said machine having rear traction wheels having a shaft provided with a gear wheel, one of said crank shafts having a gear meshed with the first named gear and provided with a sprocket wheel, said endless carrier having shafts one of which is provided with a sprocket having a sprocket chain connection with the first named sprocket, a chute supported transversely below the discharge ends of the carrier bars, a driven endless carrier in said chute, and means for supporting and effecting vertical adjustment of the forward end of the box frame.

In testimony whereof I have signed my name to this specification in the presence of two subscribing witnesses.

RICHARD R. DAMOUDE.

Witnesses:
E. L. SYLVESTER,
W. C. UECKER.